United States Patent [19]

Ogahara

[11] Patent Number: 4,512,421
[45] Date of Patent: Apr. 23, 1985

[54] METHOD FOR DRILLING COKE OVEN TOP BRICK

[75] Inventor: Fumio Ogahara, Hiroshima, Japan

[73] Assignee: Nippon Kokan Kabushiki Kaisha, Tokyo, Japan

[21] Appl. No.: 538,287

[22] Filed: Oct. 3, 1983

[30] Foreign Application Priority Data

Oct. 5, 1982 [JP] Japan .................. 57-173899

[51] Int. Cl.³ .............................. E21C 7/08
[52] U.S. Cl. .......................... 175/71; 175/17; 175/113
[58] Field of Search ............... 175/17, 71, 113, 121, 175/162, 203, 65; 408/1

[56] References Cited

U.S. PATENT DOCUMENTS

| 515,731 | 2/1894 | Daugherty et al. | 175/113 |
| 516,952 | 3/1894 | Trounson | 175/113 |
| 3,774,701 | 11/1973 | Weaver | 175/17 |
| 3,813,989 | 6/1974 | Janci | 408/1 |

FOREIGN PATENT DOCUMENTS 13964 of 1895 United Kingdom ............... 175/162

Primary Examiner—Stephen J. Novosad
Assistant Examiner—William P. Neuder
Attorney, Agent, or Firm—Fleit, Jacobson, Cohn & Price

[57] ABSTRACT

An apparatus for drilling vertical temperature measuring holes in the top brick of coke ovens includes a guide support vertically fixedly mounted on a horizontal frame on the top surface of a coke oven proper, and a guide pipe shaft connected at its upper end to a rotary drill, having a freely replaceable drilling bit attached to its lower end and including therein a cooling gaseous body passage is vertically movably mounted on the guide support in parallel thereto. In drilling operation, a first core bit with square chips is attached to the lower end of the guide pipe shaft and the top brick is first drilled to a depth of at least five times of diameter of the hole to be drilled while jetting a cooling gaseous body and cooling the core bit. Then, the bit is replaced with a second core bit with circular chips and the hole is drilled further down to near the desired depth while similarly cooling the bit and then the second bit is again replaced with a planar type drill bit with ventilation holes thus plaining the hole bottom while cooling the drill bit and thereby vertically drilling the high temperature brick without greatly damaging the inner wall of the drilled holes.

4 Claims, 11 Drawing Figures

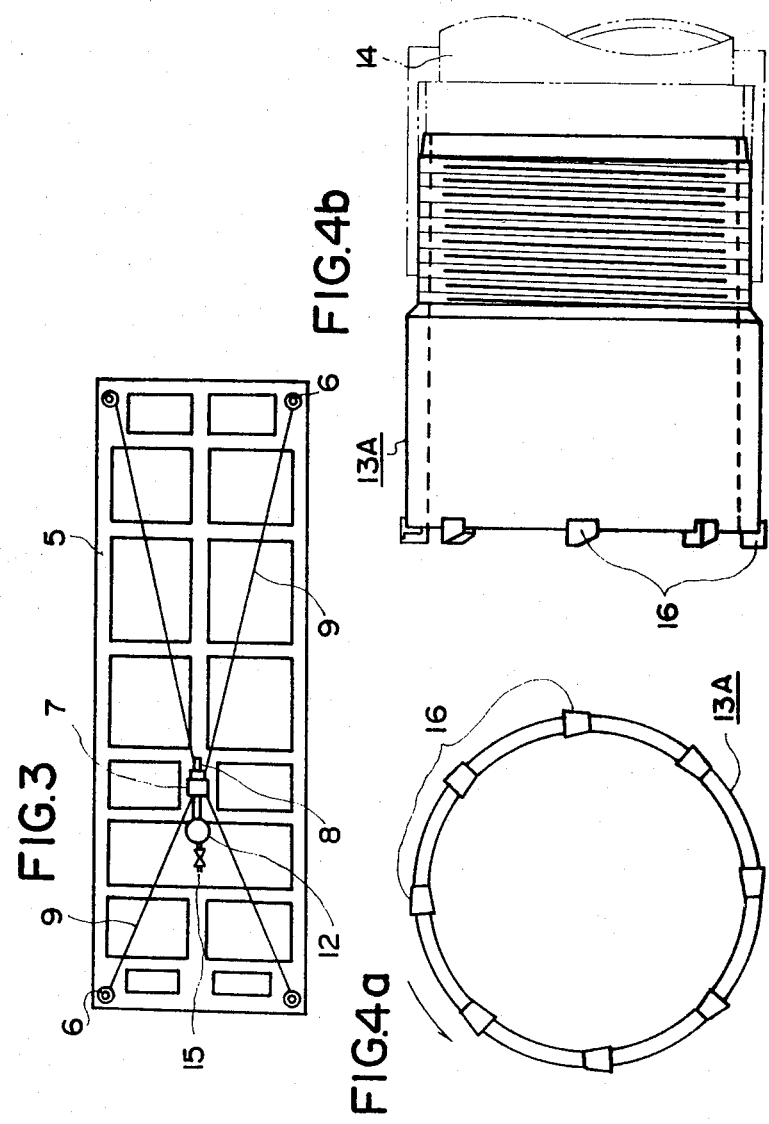

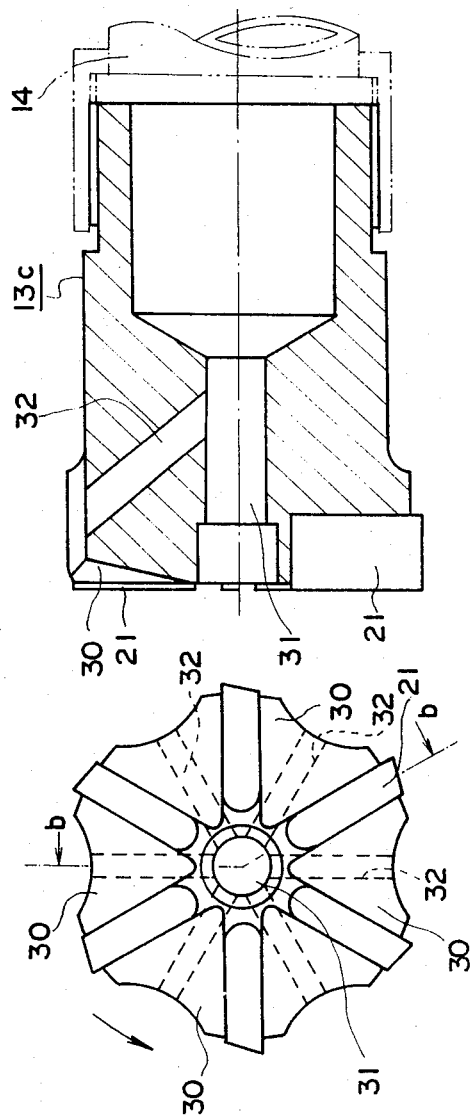

METHOD FOR DRILLING COKE OVEN TOP BRICK

BACKGROUND OF THE INVENTION

The present invention relates to an apparatus and method for vertically drilling the top brick of a coke oven proper by rotary drilling, and more particularly the invention relates to an apparatus whereby a temperature measuring hole having accurate verticality and depth is formed at each of desired positions in the top of a coke oven in operation, e.g., the brick just above the combustion chambers adjoining the carbonization chamber where the internal temperature is as high as 800° to 900° C. without causing damages to the surrounding and a drilling method which utilizes the apparatus.

Recently, a "coke oven combustion computer control system", which is extremely effective for the labor saving and energy saving in the operation of coke ovens and the improvement of coke properties, particularly coke strength, has been developed and put in use. The key point of this system is the temperature measurement of the combustion chambers and the computing control of the detailed oven temperature control and gas flow regulation required for maintaining the proper combustion chamber temperature distribution is effected by a computer in accordance with the measured temperatures. In this temperature measurement of the combustion chambers, if the temperature measuring thermocouples are directly exposed to the gas passages, the thermocouples will be damaged and become unusable in a period of 1 to 2 months due to the elevated temperatures and the corrosive components in the waste gases thus making it inevitable to indirectly measure the temperature through the refractory brick of the oven top from within the brick. As a result, it is necessary to form a large number of temperature measuring holes in the top of a coke oven, that is, it is necessary to make one or more holes per row of combustion chambers in the case of a large oven and 100 or more temperature measuring holes in the case of an oven battery including 100 or more combustion chambers.

In such a case, temperature measuring holes must be accurately formed in the oven top brick so as to ensure the temperature measurement and measuring accuracy as close to the actual gas temperatures as possible. While newly built ovens may be constructed by using bricks so shaped as to provide the required temperature measuring holes in the course of the production of oven top bricks, the life of the coke ovens is from 20 to 30 years and therefore the introduction of the previously mentioned combustion control system and hence the provision of a large number of temperature measuring holes are effected on the existing coke ovens in operation. In this case, the following problems must be overcome in connection with the provision of temperature measuring holes.

(1) Since the temperature of the top brick of a coke oven in operation is between 800° and 900° C. at the temperature measuring portion (the deep portion of the oven top wall near the combustion chamber) and the temperature is increased due to the generation of frictional heat caused by the cutting and since the refractory brick having a high degree of hardness is to be drilled, it is necessary to develop an exclusive refractory brick drilling bit which has excellent heat-resisting and wear-resisting properties.

(2) The bit must be changed at any time during the drilling of the one and the same hole in accordance with the difference in temperature due to the different hole depths, the drilling purposes, the wear of the bit, etc.

(3) The vertical accuracy of temperature measuring holes should preferably be 1/500 or less. In other words, if the drilled hole vertical accuracy is insufficient, the forward end of a vertically inserted thermocouple tends to contact or come excessively close to the inner wall of the drilled hole and moreover the large number of temperature measuring holes differ in temperature measuring condition from each other thus deteriorating the measuring accuracy and degrading the control accuracy of the temperature control system with respect to all the coke ovens.

(4) Since any damage and hence the occurrence of any cracks or the falling off of the joints at the bricks or mortar on the hole wall during the drilling causes the gas sealing of the coke oven to become insufficient and allow the waste gases to flow into the temperature measuring holes and corrode the thermocouples, the drilling apparatus and the drilling method must be such that no vibration or shock is applied to the brick.

(5) Even if a hole is drilled smoothly, there is the danger of slight cracks or the breaking of joints occuring at the drilled hole wall and it is necessary to detect and mend such cracks or breaks and thereby completely prevent the leakage of the waste gases.

In the past, due to the absence of any other needs for making holes in the brick heated to an elevated temperature under such conditions as mentioned previously, the techniques of this kind have not been developed satisfactorily. In other words, the drilling and boring machines which have heretofore been used include various types of machines, such as, the drilling machine for drilling dynamite inserting holes in coal and other mines, the boring machine for the purpose of stratum analysis sampling in civil engineering works, the drilling machine for drilling concrete milk grouting holes in the base rock in the construction of a dam, the boring machine for oil well drilling purposes, etc., and these machines are such that ① the machines are used at the room temperature and therefore the frictional heat generated during the drilling operation is on the order of 200° to 300° C. ② Originally, there is no need to give much consideration to the occurrence of damages to the inner surface of the holes or the surrounding thereof. ③ Considerable vibrations are caused. ④ No precise drilling or boring and vertical accuracy are required.

On the other hand, the top brick of a coke oven is at an elevated temperature as mentioned previously. In other words, as for example, the temperature at the bottom of the flues of the combustion chamber reaches 1,150° to 1,250° C. and therefore the temperature of the oven top brick above the combustion chamber reaches about 1,000° C. FIG. 1 shows the actual measured values in the "temperature distributions for the coke oven roof drilled hole portions" showing that the temperature at the drilled hole depth of 1,000 mm or the position of 1 m below the coke oven proper top surface is between 780° and 820° C. and the temperature at the position of 2 m below the top surface is between 890° and 960° C. (The thickness of the top brick at the time of the measurement was 2,450 mm).

Since a frictional heat is added by the drilling, the drilling bit is used at elevated temperatures of 1,200° C. or over and therefore the conventional drilling machines for cold drilling purposes cannot be used from the standpoint of heat-resisting and wear-resisting properties.

Moreover, since the oventop brick is built by joining small bricks of about 230×115×145 together with mortar, if the boring drill speed, the rate of drilling, the bit shape, etc., are not carefully selected and if the occurrence of vibrations, shock or the like is not prevented completely, there is the danger of causing cracks at the mortar joints and this some times causes cracks in the brick or breaking off of the mortar thus causing the combustion gas to enter the drilled holes and thereby making it impossible to use the conventional boring and drilling machines due to such danger.

Moreover, assuming that the entire length of a boring drill is 3 m, that the diameter of each drilled hole is 62 mm and that a thermocouple having a diameter of 20 mm is vertically hang down and inserted into the hole, the near distance between the drilled hole wall and the thermocouple forward end will be 21 mm if the drilled hole is vertical completely, and the forward end (the temperature measuring portion) of the thermocouple will contact with the hole side wall if the drilled hole verticality involves an error of 1/100. Also, since the variation in near distance is great among a large number of temperature measuring holes and since the desired accuracy for the measured temperatures at the holes and the desired measuring accuracy among the holes cannot be expected, the drilled hole verticality must be 1/500 or less. It is practically impossible for the previously mentioned conventional drilling machines to effect the drilling operation with such accuracy of drilled hole verticality.

SUMMARY OF THE INVENTION

A primary object of the present invention is to provide an apparatus and method for drilling in the top brick of a coke oven vertical temperature measuring holes with a high degree of verticality accuracy and depth accuracy without any damage to the brick.

A specific object of the invention is to provide an apparatus and method capable of drilling the high-temperature top brick of coke ovens in operation without any measure.

Another specific object of the invention is to provide a drilling machine and method for drilling an oven top brick built by joining small bricks with mortar with less danger of causing excessive vibrations or shock during the drilling operation and hence damage to the inner wall of the drilled holes.

Still another specific object of the invention is to provide a rotary drilling apparatus and method capable of drilling holes with verticality accuracy of 1/500 or less.

With a view to accomplishing the above-mentioned important objects, in accordance with the present invention there is thus provided a rotary drilling apparatus for making by rotary drilling a vertical hole in each desired drilling position at the surface of a top brick of a coke oven proper, the apparatus comprising a guide support movable on the top surface so as to be vertically positioned at each drilling position, a rotary drill vertically movably supported on the guide support, a hollow shaft connected to the rotary drill to serve as a drill rotating shaft and arranged parallel to the guide support, feed means for axially feeding the hollow shaft along the guide support, a hollow drilling bit detachably fitted to the lower end of the hollow shaft, and gaseous body supply means for forcing a cooling gaseous body into the hollow shaft in such a manner that the gaseous body is jetted from the forward end of the drilling bit.

In accordance with the invention there is also provided a rotary drilling method performed by means of such rotary drilling apparatus in which a vertically axially movable drill rotating shaft is rotated at a desired position on the top surface of a coke oven proper and a hole is made vertically by rotary drilling in the top brick at the desired position by a drilling bit fitted to the lower end of the drill rotating shaft, the method comprising: a step of vertically positioning over the drilling position a straight hollow shaft having therein a cooling gaseous body passage and adapted to serve as the drill rotating shaft; a first drilling step of fitting a first core bit with square chips to the lower end of the hollow shaft and rotating and axially feeding the hollow shaft downward while forcing a cooling gaseous body into the passage from the upper part of the hollow shaft and jetting the gaseous body from the forward end of the first core bit thereby drilling the top brick to a depth of at least five times of diameter of the hole to be drilled; a second drilling step of replacing the bit at the lower end of the hollow shaft with a second core bit having circular chips and drilling further the hole made by the first drilling step to near a predetermined target depth while forcing the cooling gaseous body into the passage from the upper part of the hollow shaft and spouting the gaseous body from the forward end of the second core bit; and a third drilling step of replacing the bit at the lower end of the hollow shaft with a planer type drill bit with ventilation holes and plaining the bottom of the hole made by the second drilling step to the target depth while forcing the cooling gaseous body into the passage from the upper part of the hollow shaft and jetting the gaseous body from the forward end of the drill bit.

In accordance with one embodiment of the invention, the guide support is provided with a rack gear formed over the lengthwise direction thereof and the feed means includes a pinion gear meshed with the rack gear, whereby the rotation of the rotary drill is transmitted at a reduced speed to the pinion gear so that the hollow shaft is fed downward in synchronism with the rotation of the drill during the drilling operation and the hollow shaft is fed upward in response to the rotation of the drill in the reverse direction.

In accordance with another embodiment of the invention, the gaseous body supply means is constructed so that the cooling gaseous body is supplied into the hollow shaft through the non-rotating housing of the rotary drill.

In accordance with still another embodiment of the invention, the guide support is vertically fixedly mounted on a frame movable on the top surface and the frame is provided with level adjusters for holding the frame in a horizontal position.

During the rotary drilling according to the invention, a gas leak test of forcing an inert gas or air into the hole after the end of the third drilling step and measuring the rate of pressure reduction should preferably be effected additionally.

It is also preferable to arrange so that depending on the result of the gas leak test or in case of need but without effecting the gas leak test, dry mortar powder is blown into the hole made by the third drilling step, particularly the high temperature hole part of 700° C. or over to mend the damaged hole wall portion and a milk of heat-resisting mortar is forced against the lower temperature part of the hole to mend the damaged portion.

In accordance with a drilling method of this invention, three kinds of drilling bits are selectively used in accordance with the different phases and purposes of the drilling operation and the operation is performed in accordance with the corresponding speeds and rates of progress thereby drilling a hole to a predetermined accurate depth without damaging the high-temperature brick and joints. Further, this drilling method precisely controls the verticality of drilled holes with the result that even if a large number of temperature measuring holes are made, the drilled temperature measuring holes ensure the measurement of temperatures under the same condition and also the reduced operating time and the saving of labor are ensured.

While the present invention is mainly applied to the drilling of temperature measuring holes for the combustion chambers of coke ovens, the present invention permits the drilling at any desired positions on any other parts than the combustion chamber, e.g., the carbonizing chamber or the waste gas flues which permit the temperature measurement through the oven top and it is also possible to design so that the drilling apparatus is made integral with a larry car or an oven top cleaner so as to be moved and stopped at any given position and the drilling apparatus is provided with various accessories, such as, a hydraulic cylinder for drilling angle setting and adjusting purposes, electromagnetic locking means for locking the drilling device in place and a position detector, e.g., a limit switch for drilled hole depth setting purposes thereby performing the drilling operation accurately and rapidly with a small number of persons.

The drilling apparatus and method of this invention make it possible to apply a combustion computer control system to the coke ovens which are in operation and therefore they have remarkable industrial effects.

The above and other objects as well as advantageous features of the invention will become more clear from the following description taken in conjunction with the drawings.

BRIEF DESCRIPTION OF THE DRAWINGS

FIG. 3 is a plan view of FIG. 2.

FIG. 4a is a front view of a first bit A used with the invention.

FIG. 4b is a side view of FIG. 4a.

FIG. 5b is a side view of FIG. 5a.

FIG. 6a is a front view of a third bit C used with the invention.

FIG. 6b is a sectional view taken along the line b—b of FIG. 6a.

DESCRIPTION OF THE PREFERRED EMBODIMENTS

Figure 1:
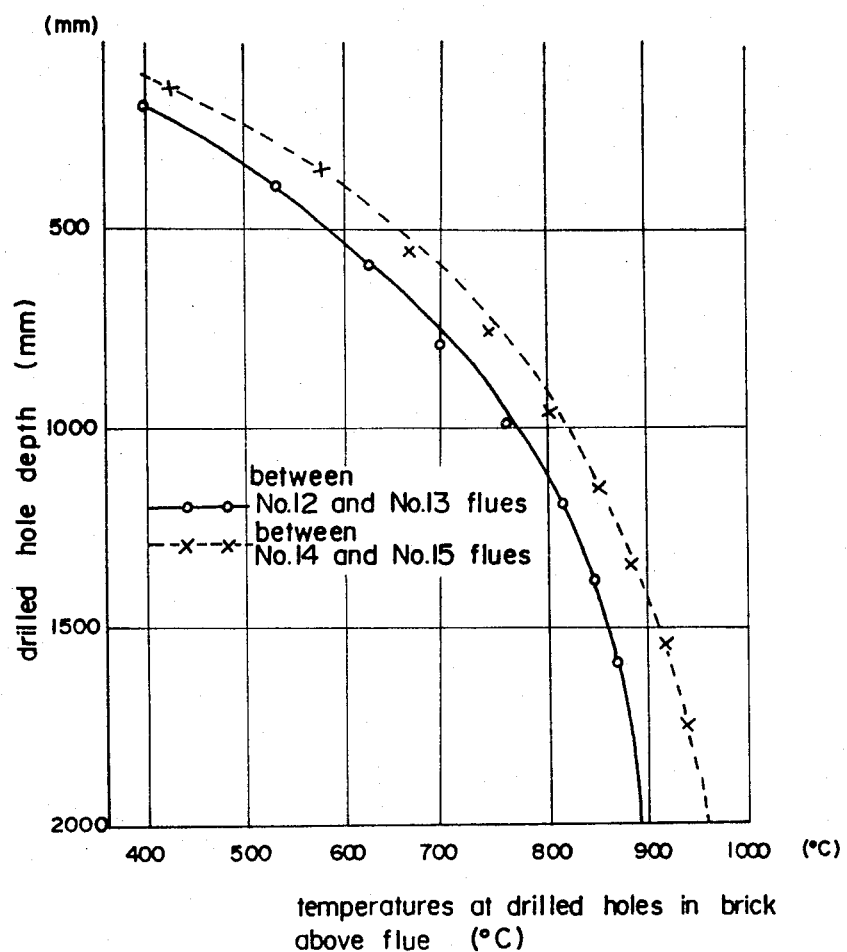
FIG. 1 is a graph showing the relationship between the depth of holes in the top brick of coke ovens and the actual measured temperatures at the drilled holes.
Figure 2:
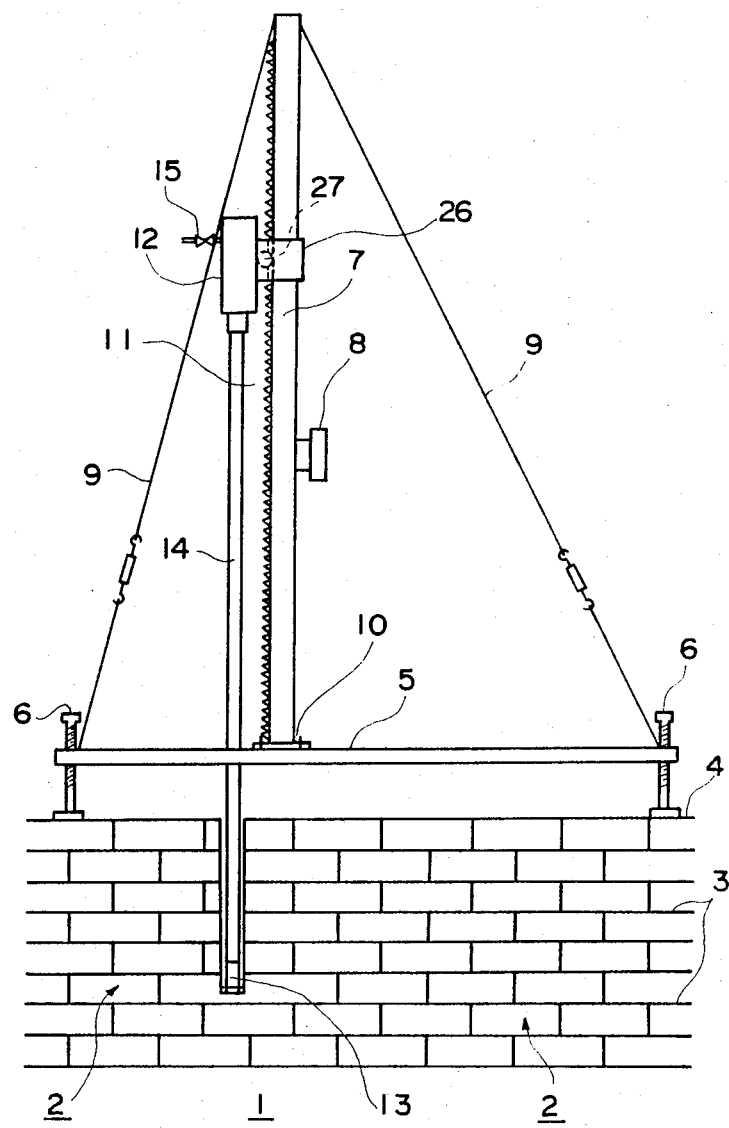
FIG. 2 is a side view showing an embodiment of a drilling apparatus according to the invention.

An embodiment of a drilling apparatus according to the invention will now be described. Referring to FIG. 2 showing a side view of the drilling apparatus on the whole and FIG. 3 showing a plan view of FIG. 2, numeral 1 designates a combustion chamber of a coke oven, and 2 a brick work built by joining hard fireclay and silica refractory bricks with joints 3 and forming the coke oven roof. Numeral 4 designates a coke oven top surface which is usually flat. Numeral 5 designates a horizontal frame arranged on the top surface 4 and consisting of a steel frame having for example a size of about 2.5 m in length and 1.0 m in width and held in a horizontal position by a level vial (not shown) and level adjusting devices 6 at the four corners. Numeral 7 designates a guide support in the form for example of a steel square column which is about 3.5 m in length and vertically fixedly mounted on the horizontal frame 5 by means of a verticality meter 8, four supporting members 9 and bottom locking bolts 10 with a verticality error of 1/500 or less.

The guide support 7 is provided with a rack 11 formed on its side along the lengthwise direction and vertically movably mounted on the rack 11 is a feed carriage 26 having a pinion 27 meshed with the rack 11. A rotary drill 12 consisting for example of an electrically operated core drill is downwardly fixedly supported on the feed carriage 26 and the rotation of the drill 12 is transmitted to the pinion 27 through a reduction gear (not shown). In other words, the feed carriage 26 vertically movably supports the rotary drill 12 on the guide support 7 and the pinion 26 is rotated in synchronism with the drill rotation to vertically move the rotary drill 12 with a predetermined reduction ratio with respect to the drill speed.

The core drill 12 includes a straight and hollow guide pipe shaft 14 serving as a drill rotating shaft and the guide pipe shaft 14 is dependent closely parallel to the guide support 7 so as to simultaneously rotate and move vertically. One of different types of hollow drilling bits 13 is selected and detachably fitted to the lower end of the guide pipe shaft 14 by means for example of coupling means such as a threaded socket as will be described later. In other words, simultaneously with the rotation of the core drill 12, the drilling bit 13 is accurately moved vertically while making a rotary motion. The rotary speed of the core drill 12 is variable in dependence on the type of the drilling bit 13.

The whole length of the core drill 12, e.g., the length from its upper end to the lower end of the drilling bit 13 is about 3.0 m and the interior of the guide pipe shaft 14 forms a passage for a cooling gaseous body such as compressed air or compressed nitrogen gas used to forcibly cool the end drill. The interior of the guide pipe shaft 14 is of course communicated with the interior of the closed housing of the core drill 12 and connected to the housing or the non-rotating part of the core drill 12 is a hose 15 for forcing the cooling gaseous body into the core drill 12 thereby supplying the cooling gaseous body under a pressure of about 2 to 3 kg/cm$^2$ (1.96–2.94 × 10$^5$ Pa) into the hollow passage inside the guide pipe shaft 14.

The drilling bits 13 of three different functions are selectively used. In other words, during the first stage of drilling, a first core bit 13A (hereinafter referred to as an A bit) having a plurality (four in this embodiment) of square chips as shown in FIGS. 4a and 4b, having no danger of causing vibrations during the cutting, excellent in cutting performance and suited for drilling to a depth of at least five times of diameter of the hole to be drilled at the brick low-temperature part (300° to 500° C.) is used for the purpose of ensuring the accuracy of hole positioning and verticality.

As shown in FIGS. 4a and 4b, the A bit 13A has a plurality of cutting chips 16 forming square edges so that high drilling accuracy is ensured and there is no danger of causing vibrations or deviation at the brick surface during the beginning of the drilling thus making it possible to vertically drill holes accurately at given positions.

Figure 5B:
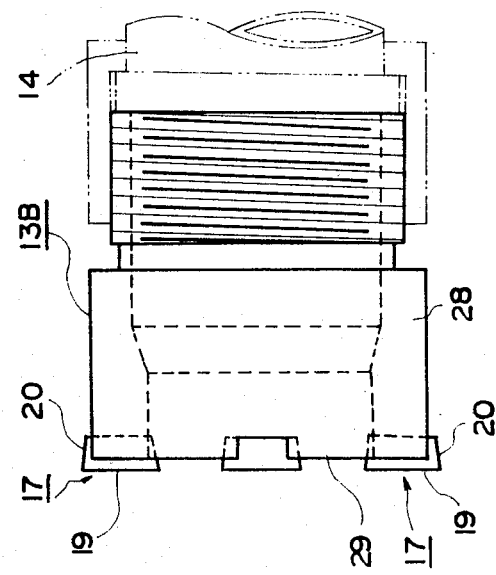
Figure 5A:
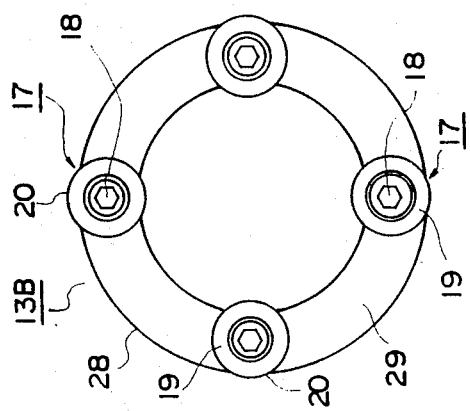
FIG. 5a is a front view of a second bit B used with the invention.

During the second stage of drilling, a second core bit 13B (hereinafter referred to as a B bit) is used which is provided with circular chips as shown in FIGS. 5a and 5b, is excellent in heat resistance and shock resistance, produces less cutting vibrations and is suited for drilling to near the desired final depth (2,200 to 2,300 mm from the top surface) at the brick high-temperature part (500° to 1,000° C.). As shown in FIGS. 5a and 5b, the B bit 13B is provided with a plurality (four in this embodiment) of right frustoconical cutting chips 17 (made of heat-resisting and wear-resisting high speed steel) which are detachably mounted on a forward end face 29 of a cylindrical bit body 28 with bolts 18. In this case, since a conical base 19 of each chip 17 forms a top cutting surface and a conical periphery 20 forms a flank and since each cutting chip 17 is formed into a circular shape, there is the effect of dispersing the cutting stress and thereby preventing any abnormal breaking due to the heating and the occurrence of vibrations. Also, since the cutting chips 17 are detachably mounted on the bit body 28, there is another advantage that a change in the rotary contact position of the chips and their replacement can be easily effected.

The third stage of drilling is intended for the purpose of smoothing out the hole bottom. Since the drilling by the cutting edges of the B bit 13B leaves a cylindrical portion at the center of the hole bottom as mentioned previously, the third stage has the purpose of smoothing out the cylindrical portion and ensuring the bottom of a predetermined depth which is as close to the combustion chamber below as possible thereby ensuring the desired accuracy of temperature measurement.

In this case, a third bit (drilling bit) 13C (hereinafter referred to as a C bit) is used which is a so-called planer cutter as shown in FIGS. 6a and 6b and similar to the cutters used for drilling the concrete, rock and the like. In FIGS. 6a and 6b, numeral 21 designates cutting edges made of a material having excellent heat-resisting and wear-resisting properties, 30 the recesses between the cutting chips, 31 a central ventilation hole, and 32 side ventilation holes. Thus, the C bit 13C is a hollow planer type drill bit with ventilation holes and it is capable of operating at a speed of about 900 rpm and cutting speed of 30 to 35 mm/min and giving a smooth plaining cutting finish to the hole bottom.

Since each of the bits 13A, 13B and 13C is heated to an elevated temperature due to the heat transmitted from the high temperature brick and the cutting frictional heat, a cooling gaseous body such as compressed air or compressed $N_2$ gas is forced into the bit equipped guide pipe shaft 14 from the upper part thereof so as to forcibly cool the bit. In other words, as shown in FIGS. 4a and 4b or FIGS. 5a and 5b, the inner end of each of the cutting chips 16 of the A bit 13A or the inner end of each of the cutting chips 17 of the B bit 13B is positioned on the inner side of the inner wall surface of the guide pipe shaft 14 whose interior is communicated with the core bit, with the result that a clearance is formed between the brick core cut and left within the guide pipe shaft 14 and its inner wall surface and thus the cooling gaseous body flows through the clearance. In the case of the planer type drill bit (C bit) 13C, as shown in FIGS. 6a and 6b, the cooling gaseous body, flows through the ventilation holes 31 and 32 which are communicated with the interior of the guide pipe shaft 14. Further, with each of the bits 13A, 13B and 13C, the outer end of each cutting chip is projected to the outside of the outer surface of the guide pipe shaft 14, with the result that a clearance is formed between the guide pipe shaft outer surface and the drilled hole wall and the return of the gaseous body blows up and discharges the brick chips toward above the oven through the clearance.

By virtue of the above-described construction of the drilling apparatus according to the invention, the apparatus is capable of drilling the high temperature brick of the coke oven tops so as to make a large number of temperature measuring holes in a short period of time without any variation but with a high degree of verticality accuracy and greater accuracy of depth. Also, due to the selective use of the suitable bits in dependence on the respective drilling stages, there is no danger of causing vibrations or shock with the result that the damages to the brick and the joints around the drilled hole are minimized and the maintenance after the drilling is easy. There are many other advantages that the corrosion of thermocouples is prevented, that the leakage of waste gases is prevented and so on.

Also, the drilling apparatus can be mounted on the larry car or the oven top cleaner above the coke ovens so as to perform the drilling operation and thereby performing the drilling operation of a large number of temperature measuring holes effectively in a short period of time.

Figure 7:
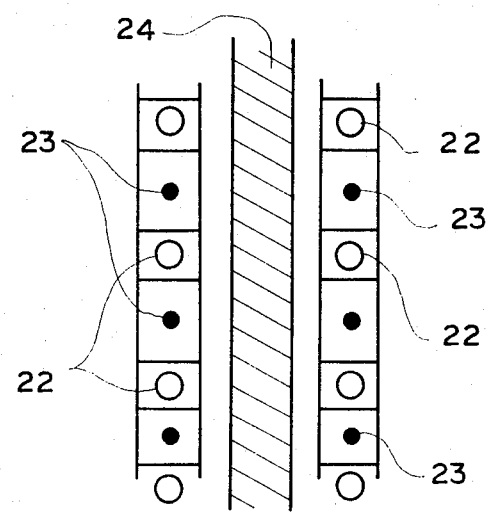
FIG. 7 is a plan view showing the drilling positions of temperature measuring holes in the coke oven top.

A drilling method performed by means of the drilling apparatus according to the invention will now be described. As shown in FIG. 7 illustrating a partial plan view of a coke oven top, the drilling positions of temperature measuring holes in the coke oven top are indicated at central positions 23 between a plurality of flues 22 (combustion flues) above the combustion chambers and also the hole depth and hole diameter are respectively preset to sizes of 2,200 to 2,300 mm and 50 to 60 mmφ although they vary more or less depending on the types of coke ovens. A hatched portion 24 indicates the position of carbonizing chambers.

Firstly, the drilling apparatus is mounted on the larry car or the like and moved to near the position where a hole is to be made thereby placing the horizontal frame 5 shown in FIGS. 2 and 3 at the drilling position (the horizontal frame has a predetermined vertical mounting position for the guide support). The horizontal frame 5 is maintained in a horizontal position by the level vial (not shown) and the adjusting members 6. The verticality of the guide support 7 mounted on the frame 5 is measured by the verticality meter 8 and the supporting members 9 are adjusted in accordance with the measurement result thereby maintaining the verticality error within 1/500 or less. Finally, the guide support 7 is fixedly mounted on the frame 5 with the bottom locking bolt 10. The A bit 13A shown in FIGS. 4a and 4b is fitted to the lower end of the guide pipe shaft 14 and aligned with the drilling position. Then, the motor for the rotary core drill 12 is energized and N$_2$ gas (or compressed air) having a pressure of 2 to 3 Kg/cm$^2$ (1.96–2.94×10$^5$Pa) is supplied to the gas passage inside the guide pipe shaft 14 thereby starting the drilling while cooling the guide pipe shaft 14 and the A bit 13A. The suitable rotational speed and drilling speed of the A bit 13A are respectively about 900 rpm and about 40 to 45 mm/min. By drilling to a depth of at least five times of diameter of the hole to be drilled, for example, 300 mm, it is possible to ensure the desired position and verticality of the hole. The cut brick particles and mortar particles are moved and blown upward by the cooling compressed gaseous body through the clearance between the outer surface of the guide pipe shaft 14 and the drilled hole wall. This first stage of drilling is completed in 7 to 8 minutes.

Then, the drill 12 is rotated in the reverse direction so that the pinion 27 is rotated in the reverse direction and the feed carriage 26 is moved upward. Thus, the guide pipe shaft 14 is lifted again and the drilling bit 13A is replaced with the B bit 13B shown in FIGS. 5a and 5b. In other words, the second stage of drilling performs the operation of drilling the temperature measuring hole further down by about 2,000 mm to near the desired depth of the hole and therefore the B bit 13B having excellent heat-resisting and wear-resisting properties is used. In this case, in order to prevent damages to the bricks and the mortar around the drilled hole, the optimum drilling conditions will be selected, that is, the drill rotational speed and drilling speed will respectively be 900 to 950 rpm and 60 to 80 mm/min, for example. While the drilling bit is cooled forcibly by the cooling gaseous body during its rotation, when an occasion demands, the bit is replaced with a new B bit in the course of the operation so as to avoid the occurrence of vibrations due to the progress of wear of the bit. While the actual drilling time is about 30 minutes under the previously mentioned exemplary drilling conditions, the required total working time including the bit changing is about 40 minutes. In the second stage, the amount of cutting and distance per unit time are great and thus the resulting brick core is left as a cylindrical mass within the hollow portion of the guide pipe shaft 14. Therefore, during the bit changing the cylindrical mass is lifted as such along with the guide pipe shaft 14 and the mass is removed on the outside of the hole.

Figure 8:
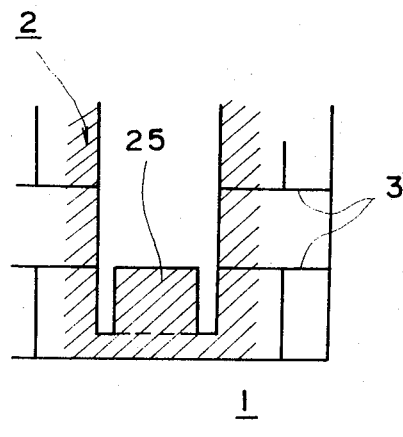
FIG. 8 is a longitudinal side view showing condition of a hole drilled to a predetermined depth by the B bit.

FIG. 8 shows the condition of the hole drilled to near the final depth by the B bit 13B and it will be seen that there is left a cylindrical portion 25 of the brick at the final-depth part corresponding to the bore of the B bit 13B. If the temperature is measured in this condition, it is impossible to measure the temperature close to the combustion chamber 1 and also variation in the degree of proximity is caused. Thus, it is necessary to perform an operation of giving a flat bottom finish to the hole bottom up to the predetermined depth (degree of proximity).

As a result, the following third stage replaces the B bit 13B with the C bit 13B shown in FIGS. 6a and 6b and the plaining of the hole bottom and a fine adjustment of the depth are effected simultaneously. The C bit 13C used for the third stage of drilling is a plaining drill bit as shown in FIGS. 6a and 6b and the brick in front of the bit is cut smoothly and horizontally. In this case, by checking the amount of downward movement of the guide pipe shaft 14 from the oven top position by position detecting means such as a limit switch, the bottom depth of each of a large number of holes can be adjusted to a predetermined depth with the accuracy of ±2 mm during the drilling.

Now referring to the maintenance of the hole walls after the drilling, while the apparatus, jigs, and operation method of the above-mentioned drilling operation all consider it as an important point to prevent damages to the refractory bricks and the mortar around the drilled hole wall, a gas leak test should preferably be performed for caution's sake even if the operation has been completed smoothly. In other words, the upper end of the drilled hole is sealed hermetically and N$_2$ gas (or compressed air) is forced into the hole at the gauge pressure of 50 mm Aq thereby grasping the presence of cracks and breaks in the hole wall in accordance with the rate of pressure drop. The presence of any defect requires a repair.

The high-temperature part (about the lower two third of the drilled hole) having a brick temperature of 700° C. or over and the low-temperature part (about the upper one third of the hole) are repaired separately and dry mortar powder is sprayed into the high-temperature part to fill any crack or break with the mortar. On the other hand, heat resisting mortar in milky form is forced into the hole wall of the low-temperature part so that the mortar penetrates into any crack and the wall surface is coated with the mortar. In this way, the leakage of waste gases is prevented completely.

What is claimed is:

1. In a method wherein a vertically axially movable drill rotating shaft is rotated at each desired position on a top surface of a coke oven proper so as to rotary drill vertically a hole in a top brick at said position with a drilling bit attached to a lower end of said drill rotating shaft, the improvement comprising:

a step of vertically positioning said drill rotating shaft on a drilling position, said drill rotating shaft comprising a straight hollow shaft having therein a cooling gaseous body passage;

a first drilling step of attaching a first core bit with square chips to a lower end of said hollow shaft and rotating said hollow shaft to axially feed the same downward while forcing a cooling gaseous body into said passage through an upper part of said hollow shaft and jetting said cooling gaseous body from a forward end of said first core bit thereby drilling the top brick to a depth of at least five times of diameter of the hole to be drilled;

a second drilling step of replacing said first bit at the lower end of said hollow shaft by a second core bit with circular chips and drilling said hole drilled by said first drilling step further down to near a predetermined target depth while forcing the cooling gaseous body into said body through the upper part of said hollow shaft and jetting said cooling gaseous body from a forward end of said second core bit; and a third drilling step of replacing said second bit at the lower end of said hollow shaft with a planer type drill bit including ventilation holes and smoothly plaining a bottom of said hole drilled by said second drilling step down to said target depth while forcing the cooling gaseous body into said passage through the upper part of said hollow shaft and jetting said cooling gaseous body from a forward end of said planer type drill bit.

2. A rotary drilling method according to claim 1 further comprising a gas leak test step of forcing an inert gas or air into said hole planed by said third drilling step and measuring a rate of decrease in a pressure of said inert gas or air.

3. A rotary drilling method according to claim 1, further comprising a step of spraying dry mortar powder into said hole planed by said third drilling step to repair any damaged portion on the wall thereof.

4. A rotary drilling method according to claim 1, further comprising a step of forcing a milk of heat-resisting mortar against any damaged portion on an inner wall of said hole planed by said third drilling step and thereby repairing said damaged portion.

* * * * *